United States Patent
Sanford

[15] 3,698,294
[45] Oct. 17, 1972

[54] SENSITOMETER APPARATUS
[72] Inventor: Lloyd C. Sanford, Acton, Mass.
[73] Assignee: Itek Corporation, Lexington, Mass.
[22] Filed: April 1, 1968
[21] Appl. No.: 717,870

[52] U.S. Cl. .........................95/1, 356/229, 356/235
[51] Int. Cl............G01j 1/10, G01j 1/40, G01j 3/10
[58] Field of Search .........95/1, 10; 355/71; 356/229, 356/235

[56] References Cited
UNITED STATES PATENTS 1,930,137  10/1933  Twyman ..................355/71 X
2,053,317  9/1936  Billing ..........................355/71

Primary Examiner—John M. Horan
Attorney—Homer O. Blair, Robert L. Nathans, Lester S. Grodberg and John E. Toupal

[57] ABSTRACT

A sensitometer having a replaceable integral exposure source unit including both a constant source of actinic energy and an energy modulator. Because of the fixed relationship between its individual components, the modulated energy output remains at a known, constant level over the life of the exposure unit.

13 Claims, 4 Drawing Figures

PATENTED OCT 17 1972
3,698,294
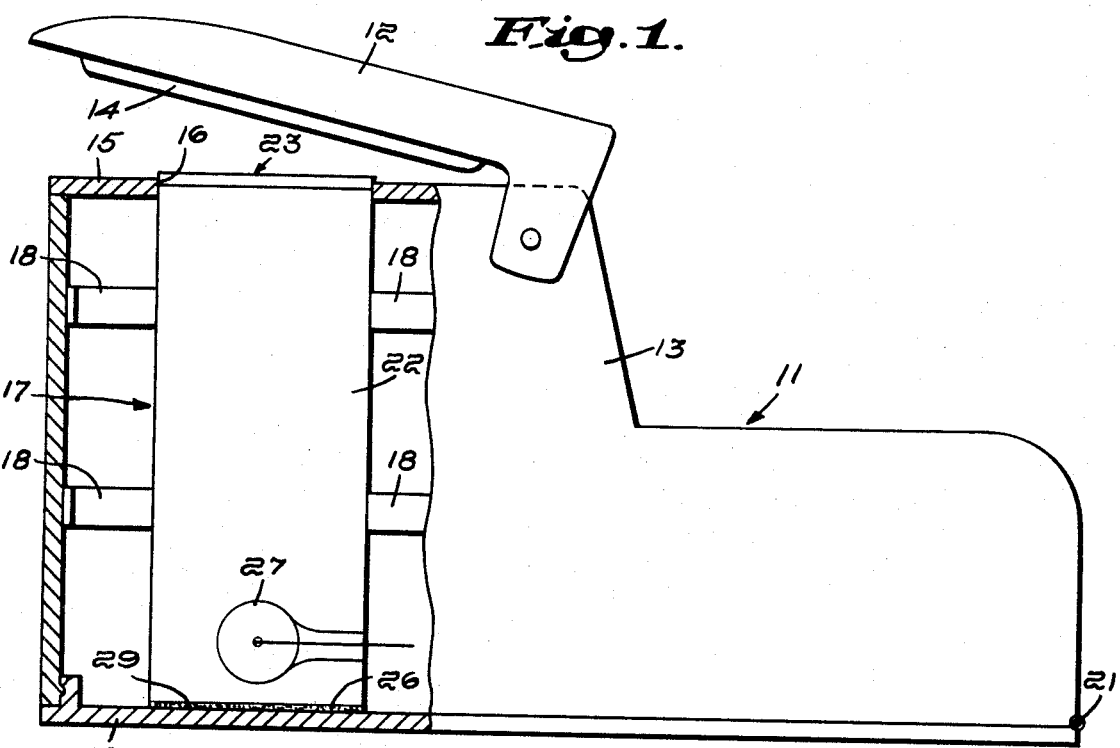
Fig. 1.
Fig. 2.
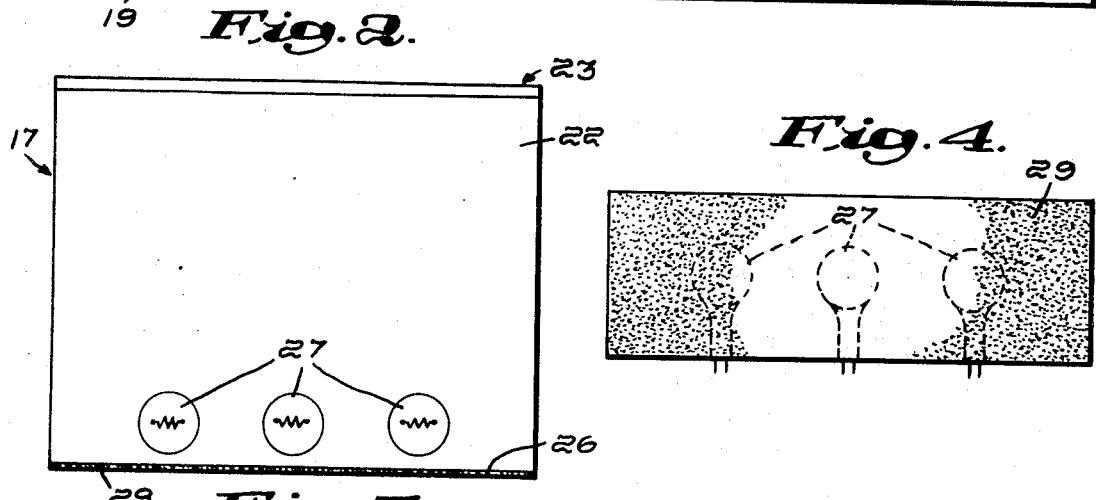
Fig. 4.
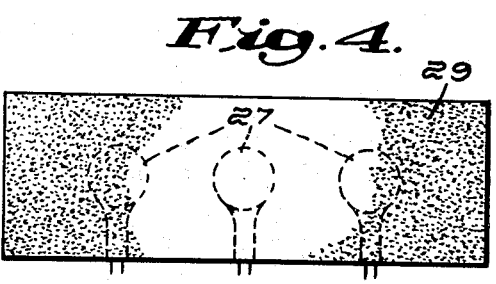
Fig. 3.
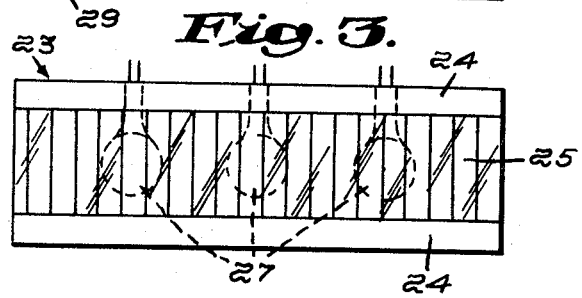
Inventor:
Lloyd C. Sanford,
by John E. Toupal
Attorney

SENSITOMETER APPARATUS

BACKGROUND OF THE INVENTION

This invention relates to sensitometry. More precisely, the invention disclosed herein relates to apparatus useful for evaluating the response of photographic film to actinic energy which in turn is indicative of such properties as the photographic speed, density production, the contrast, processing characteristics, and the like of photographic film material.

Sensitometry is well known to those skilled in the photographic art and essentially involves the measurement and evaluation of the response of photographic materials to radiant energy. As presently practiced, sensitometry involves the determination of the density of photographic film materials exposed to a source of illumination of known intensity and spectral distribution for a known time, the development of the exposed film under precisely controlled and reproducible conditions, the correlation of the densities measured in the film to established standards for density, and the interpretation of the results.

The present invention relates to a novel sensitometer having a combination of structural elements which cooperate in an integrated fashion to permit the activation of a photosensitive material with an exposure source having a known and constant luminous flux output. Sensitometers heretofore used in the field consist of a light source and a means of varying the exposure given to the film by varying either the intensity and/or the time of that exposure. Light sources for sensitometric exposures must be selected with consideration to both their suitability for the sensitive material as well as their suitability in intensity and spectral distribution. Moreover, precautions must be taken so that the total illumination by the light source incident upon the film is maintained constant together with the spectral distribution so that valid interpretations may be made.

In some instances heretofore, sensitometers have employed incandescent sources such as tungsten-filament lamps. Generally in such sensitometers, the light has passed from the incandescent source to the film through a calibrated shutter for controlling the exposure interval. However, an outstanding problem in such sensitometers is that it is extremely difficult to control both the intensity of light obtained from incandescent sources as well as the spectral distribution thereof. For example, transient variations in voltage produce very great changes not only in the quantity or intensity of the incandescent light but also in the color or spectral distribution thereof. Accordingly, sensitometric determinations made from such sensitometers are usually unreliable unless precautions are taken to assure that the intensity and the spectral distribution of the illumination of the source can be accurately reproduced from time to time.

In order to avoid the disadvantages implicit in the use of incandescent sources, various sensitometers have been proposed which utilize flash lamps. Since the light output intensity of these lamps varies only as the square of applied voltage, transient voltage variations during the production of very short light flashs do not materially alter light output. In addition, the spectral distribution of the produced light is nearly independent of voltage.

Although substantially alleviating problems associated with non-uniform light sources, flash lamp sensitometers have not solved fully the burdensome requirements for frequent instrument calibration. Precision photographic sensitometry requires accurate calibration of exposure levels which are determined not only by lamp output intensity but also by the elements normally used to modulate that output. Since each component in an exposure source possesses unique optical characteristics, any change in their combination will modify exposure output levels regardless of the components individual consistency. Thus, for example, replacement of either the flash lamp or density wedge in a typical exposure source will shift previous log exposure plot points on the X-axis of a conventional sensitometric plot. Accordingly, an instrument must be recalibrated and a new sensitometric plot prepared after each component change in its exposure source. Not only are these requirements burdensome but since individual exposure source components and particularly density wedges are readily exchanged in conventional sensitometers, a user of a particular instrument is not always assured that an available sensitometric plot corresponds to a current set of exposure components. Consequently, he must either risk inaccurate measurements or recalibrate the exposure source.

The object of this invention, therefore, is to provide an improved sensitometer that improves accuracy while reducing calibration requirements.

CHARACTERIZATION OF THE INVENTION

The invention is characterized by the provision of a sensitometer including an integral exposure source unit removably mounted within a light-tight housing. The exposure unit is formed by a light source retained in an enclosure having an aperture portion formed by a light modulator that receives light from the light source and provides a variably modulated output thereof. Attached to the light-tight housing is a retainer adapted to fix photosensitive materials in position to receive modulated light from the aperture portion of the enclosure. By providing all required components of an exposure source in an integral replaceable unit, uniform exposure output levels are insured for the useful life of the unit. Therefore, only one graduated sensitometric plotting sheet need be prepared for each exposure source unit.

One feature of this invention is the provision of a sensitometer of the above type wherein the light source comprises a plurality of electric flash lamps and the light modulator is a photographic density wedge. The flash lamps provide a highly desirable, uniform source of luminous flux and the density wedge renders the instrument suitable for a wide variety of measurement applications.

Another feature of this invention is the provision of a sensitometer of the above featured type wherein the exposure source enclosure comprises a block of light transmissive material potted around the electric flash lamps. The enclosure block provides the exposure unit with a high degree of physical stability and resultant exposure output level consistency.

Another feature of the invention is the provision of a sensitometer of the above featured type wherein the exposure unit enclosure is a rectangular block with one surface forming the aperture portion and polished specular remaining surfaces adapted to reflect light received from the flash lamps toward the aperture portion. By providing specular surfaces, the exposure source enclosure functions as a light director and mixer tEat intensifies the luminous flux received by the aperture portion.

Another feature of this invention is the provision of a sensitometer of the above featured types wherein the flash lamps are embedded adjacent a specular, reflectively coated enclosure block and surface opposite the surface forming the aperture portion. In this arrangement, the frustrated internal reflection within the enclosure block creates a multiplicity of virtual light sources behind the aperture portion thereby providing extremely uniform illumination thereof.

These and other objects and features of the present invention will become more apparent upon a perusal of the following specification taken in conjunction with the accompanying drawings wherein:

FIG. 1 is a schematic, partially broken away, side view of a preferred sensitometer embodiment of the invention;

FIG. 2 is a front view of the exposure source unit shown in FIG. 1;

FIG. 3 is a top view of the exposure source unit shown in FIG. 2; and

FIG. 4 is a bottom view of the exposure source unit shown in FIGS. 2 and 3.

Referring now to FIG. 1 there is shown the sensitometer 11 including the cover 12 pivotally attached to the light-tight housing 13. Secured to the bottom of the cover 12 is the light seal member 14 formed, for example, of a suitable foam rubber material. Upon closure of the cover 12, the seal member 14 contacts the top surface 15 of the light-tight housing 13 thereby light-sealing the opening 16 disposed therein. As shown in the broken away portion of FIG. 1, the integral exposure source unit 17 is positioned within the light-tight housing 13. Secured within the housing 13 are the mounting brackets 18 that align the exposure source unit 17 with the opening 16. The bottom plate 19 is attached by the hinge 21 to permit opening of the light-tight housing 13 and removal of the source unit 17.

As shown in FIGS. 2-4, the source unit 17 comprises the solid rectangular block 22 made of a suitable light transmissive material such as plastic or glass. Forming the top surface of the exposure unit 17 is the light modulator plate 23 which is permanently fixed to the rectangular block 22 by, for example, a suitable cement. The light modulator plate 23 possesses the longitudinally disposed opaque marginal regions 24 that straddle the conventional photographic density wedge 25.

Located within the block 22 adjacent the end 26 opposite the density wedge 25 are the actinic energy sources 27 which are preferably flash lamps of, for example, the tungsten or xenon type. Although three lamps 27 are shown, it will be appreciated that either a single lamp or other numbers of lamps can be used. The lamps 27 can be embedded within the block 22 in any suitable manner as, for example, by being potted therein or by being inserted and sealed within bored holes. All surfaces of the unit 17 are polished, specular surfaces except the end surface formed by the light modulator plate 23. The opposite end 26 adjacent the lamps 27 is coated with a layer 29 of a light reflective substance such as aluminum.

During operation of the sensitometer 11, a film (not shown) to be exposed is placed over the exposure window 16 with its photosensitive coating facing the exposure unit 17. The cover 12 is closed against the surface 15 causing the seal member 14 to form a light-tight seal and press the inserted film into intimate contact with the exposure window. Then, a firing switch (not shown) is actuated causing a power supply circuit (not shown) within the light-tight housing 13 to energize the flash lamps 27. The illumination produced by energization of the flash lamps 27 is directed by the exposure source block 22 toward the exposure aperture formed by the density wedge 25. After being variably modulated by passage through the density wedge 25, this illumination exposes the retained film in the conventional manner. The details of the power supply circuit utilized to energize the lamps 27 does not, per se, form a portion of this invention. However, power supplies suitable for use in the invention are disclosed in U. S. Pat. No. 3,001,459 issued Sept. 26, 1961 and in U. S. Pat. Application Ser. No. 560,557 entitled "Improved Sensitometer" and filed June 27, 1966 by the present applicant.

Because all components of the exposure source 17 are formed into an integral unit, the modulated exposure output levels from the density wedge 25 remain constant over the life of the flash lamps 17. Therefore, a single calibrated sensitometric plotting sheet of the conventional type will provide accurate log exposure plot points for the life of the exposure unit 17. In practice, this graduated plotting sheet would be supplied to the user by the manufacturer along with the associated exposure unit 17. After the absolute luminous flux density output of the lamps 27 has been modified by extended use, the user of the sensitometer 11 merely opens the bottom 19 and replaces the entire exposure unit 17 with a replacement unit. Thereafter, precision photographic sensitometry again is obtained by utilizing a new sensitometric plotting sheet corresponding uniquely to the replacement unit.

Additional measurement accuracy is provided by the optical characteristics of the rectangular block 22. The specular surfaces 28 and 29 transmit the light emanating from the flash lamps 27 toward the output aperture formed by the density wedge 25. However, because of the frustrated internal reflection produced by these surfaces, a multiplicity of virtual light source are created behind the aperture 25. Therefore, the aperture 25 is illuminated extremely uniformly and measurement accuracy of the sensitometer 11 is enhanced.

In the invention embodiment shown and disclosed, a flash lamp source of actinic energy is used to provide the constant exposure time required for measurement accuracy. It will be obvious, however, that other types of constant exposure mechanisms could be used within the scope of the invention. For example, a conventional unit comprising a continuous light source and an accurately timed shutter could be used to supply the constant exposure.

Obviously, many modifications and variations of the present invention are possible in light of the above teachings. It is, therefore, to be understood that within the scope of the appended claims the invention can be practiced otherwise than as specifically described.

What is claimed is:

1. In a sensitometer which enables the determination of the response characteristics of a photosensitive medium to actinic radiation by exposing the photosensitive medium to actinic radiation, from an actinic energy source means, which has been modulated by a variable density energy modulation means, the improvement comprising: an exposure source unit including said actinic energy source means, said variable density energy modulation means, and means for providing a plurality of radiation paths from said actinic energy source means to said energy modulation means, said exposure source means to said energy modulation means, said exposure source unit comprising a unitary, integrally-constructed unit for preventing said actinic energy source means or said energy modulation means from being replaced without the effective destruction of the exposure source unit, and including:
 a. means to irreplaceably secure said actinic energy source means to said integrally-constructed exposure source unit of said sensitometer for preventing the replacement of said actinic energy source means without breaking the exposure source unit; and
 b. means to irreplaceably secure said energy modulation means to said integrally-constructed exposure source unit of said sensitometer for preventing the replacement of said energy modulation means without breaking the exposure source unit.

2. A sensitometer apparatus according to claim 1 wherein said actinic energy source means comprises an electric flash lamp.

3. A sensitometer apparatus according to claim 1 wherein said exposure source unit includes a block of actinic energy transmissive material potted around said actinic energy source means.

4. A sensitometer apparatus according to claim 1 wherein said energy modulation means comprises a photographic density wedge.

5. A sensitometer apparatus according to claim 4 wherein said actinic energy source means comprises an electric flash lamp.

6. A sensitometer apparatus according to claim 5 wherein said exposure source unit includes a rectangular block of light transmissive material potted around said flash lamp.

7. A sensitometer apparatus according to claim 6 wherein said density wedge is located along one elongated surface of said block and the remaining surfaces are polished, specular surfaces adapted to reflect light received from said flash lamp toward said density wedge.

8. A sensitometer apparatus according to claim 7 wherein said flash lamp is potted within said block adjacent an end surface thereof opposite said aperture portion.

9. A sensitometer according to claim 8 wherein said end surface of said block is coated with a reflective substance.

10. A sensitometer apparatus according to claim 1 wherein said exposure source unit includes a rectangular block of actinic energy transmissive material potted around said actinic energy source means.

11. A sensitometer apparatus according to claim 10 wherein said energy modulation means is located along one elongated surface of said block and the remaining surfaces are polished, specular surfaces adapted to reflect energy received from said energy source means toward said energy modulation means.

12. A sensitometer apparatus according to claim 11 wherein said energy source means is potted within said block adjacent an end surface thereof opposite said aperture portion.

13. A sensitometer according to claim 12 wherein said end surface of said block is coated with a reflective substance.

* * * * *